US012584541B2

(12) United States Patent (10) Patent No.: US 12,584,541 B2
Suzuki (45) Date of Patent: Mar. 24, 2026

(54) VEHICLE TRANSMISSION AND VEHICLE HAVING THE SAME

(71) Applicant: YAMAHA HATSUDOKI KABUSHIKI KAISHA, Iwata (JP)

(72) Inventor: Tomomi Suzuki, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/772,641

(22) Filed: Jul. 15, 2024

(65) Prior Publication Data

US 2025/0230856 A1     Jul. 17, 2025

(30) Foreign Application Priority Data

Jan. 17, 2024     (JP) ................................. 2024-005124

(51) Int. Cl.
| | |
|---|---|
| *F16H 3/091* | (2006.01) |
| *F16D 7/02* | (2006.01) |
| *F16H 3/093* | (2006.01) |
| *F16H 57/021* | (2012.01) |
| *F16H 57/031* | (2012.01) |
| *F16H 57/04* | (2010.01) |
| *F16H 57/02* | (2012.01) |

(52) U.S. Cl.
CPC ............. *F16H 3/091* (2013.01); *F16D 7/027* (2013.01); *F16H 3/093* (2013.01); *F16H 57/021* (2013.01); *F16H 57/031* (2013.01); *F16H 57/0424* (2013.01); *F16H 2057/02043* (2013.01); *F16H 2057/02052* (2013.01)

(58) Field of Classification Search
CPC ........ F16H 3/091; F16H 3/093; F16H 57/021; F16H 57/031; F16H 57/0424; F16H 2057/02043; F16H 2057/02052; F16D 7/027
See application file for complete search history.

(56) References Cited

U.S. PATENT DOCUMENTS

| | | | | |
|---|---|---|---|---|
| 2,850,920 A * | 9/1958 | Petsch | ................ | B60K 17/3505 |
| | | | | 192/48.91 |
| 3,675,508 A * | 7/1972 | Blank | ..................... | F16H 3/093 |
| | | | | 74/357 |
| 2006/0130802 A1* | 6/2006 | Laimboeck | ............ | B60K 17/02 |
| | | | | 123/197.1 |
| 2019/0193553 A1 | 6/2019 | Uno et al. | | |
| 2019/0226576 A1* | 7/2019 | Guarino | .................. | F16D 13/52 |
| 2022/0268341 A1* | 8/2022 | Vassieux | ................. | F16H 3/126 |

FOREIGN PATENT DOCUMENTS

| | | |
|---|---|---|
| JP | 2019-116198 A | 7/2019 |

* cited by examiner

*Primary Examiner* — Joseph Brown
(74) *Attorney, Agent, or Firm* — Rabin & Berdo, P.C.

(57) ABSTRACT

A vehicle transmission, including: a drive shaft configured to receive a shifted torque; a middle shaft arranged in parallel to the drive shaft; a first bearing that rotatably supports the drive shaft; a second bearing that rotatably supports the middle shaft; a first middle gear attached to a portion of the drive shaft that is on a further distal side of the drive shaft than is the first bearing; and a second middle gear attached to a portion of the middle shaft that is on a further distal side of the middle shaft than is the second bearing, the second middle gear being connected to the first middle gear.

7 Claims, 8 Drawing Sheets

VEHICLE TRANSMISSION AND VEHICLE HAVING THE SAME

CROSS-REFERENCE TO RELATED APPLICATIONS

The present application claims priority from Japanese Patent Application No. 2024-5124, filed Jan. 17, 2024, the entire contents of which are hereby incorporated by reference.

BACKGROUND OF THE INVENTION

Field of the Invention

The present invention relates to a vehicle transmission and a vehicle having the same.

Description of the Related Art

Conventionally, vehicles having an engine and a transmission are suitable for vehicles such as, for example, ROVs (Recreational Off-highway Vehicles) and ATVs (All Terrain Vehicles) that travel over rough terrain (see, for example, JP 2019-116198 A).

FIG. 8 is a cross-sectional view of an example transmission. The transmission 100 includes an input shaft 101 to which the drive force of the engine is input, a main shaft 103 connected to the input shaft 101 via a clutch 102, a drive shaft 105 connected to the main shaft 103 via a multi-stage gear 104, a middle shaft 107 connected to the drive shaft 105 via a middle gear 106. The drive force of the middle shaft 107 is transmitted to the wheels (not shown) by a power transmission member such as a drive shaft 108. As the vehicle includes a transmission, the occupant can change the reduction ratio within a predetermined range while driving.

Now, depending on the use of the vehicle or the driving environment, the occupant, etc., may wish to replace the wheels. Here, if the outer diameter of the wheel changes as a result of the replacement, the drive force of the vehicle and the speed at which the vehicle can run will change. With the transmission as shown in FIG. 8, it is difficult to change the reduction ratio of the transmission when the wheels are replaced because the middle gear 106 cannot be easily replaced. Even if the wheels are not replaced, one may wish to increase the maximum speed or increase the drive force to climb a steeper hill. If the middle gear 106 is easily replaceable, it will be easy to increase the maximum speed or the drive force by replacing the middle gear 106.

An object of the present invention, which has been made in view of the above, is to provide a vehicle transmission with which it is relatively easy to change the reduction ratio by replacing the middle gear, and a vehicle having the same.

SUMMARY OF THE INVENTION

A vehicle transmission disclosed herein includes: a drive shaft to which a shifted torque is transmitted; a middle shaft arranged parallel to the drive shaft; a first bearing that rotatably supports the drive shaft; a second bearing that rotatably supports the middle shaft; a first middle gear that is attached to a portion of the drive shaft that is on a distal end side of the drive shaft relative to the first bearing; and a second middle gear that is attached to a portion of the middle shaft that is on a distal end side of the middle shaft relative to the second bearing and is connected to the first middle gear.

With the vehicle transmission described above, since the first middle gear is arranged on the distal end side of the drive shaft relative to the first bearing, the first middle gear can be removed without removing the first bearing by pulling out the first middle gear from the drive shaft toward the distal end side. Since the second middle gear is arranged on the distal end side of the middle shaft relative to the second bearing, the second middle gear can be removed without removing the second bearing by pulling out the second middle gear from the middle shaft toward the distal end side. Thus, it is possible to relatively easily replace the first middle gear and the second middle gear. This allows the reduction ratio to be changed relatively easily when, for example, replacing the wheels.

The vehicle transmission may include: a main shaft arranged parallel to the drive shaft; a plurality of first gears attached to the main shaft; and a plurality of second gears attached to the drive shaft and meshing with the plurality of first gears, respectively.

Thus, it is possible to provide the effect that the reduction ratio can be easily changed in a so-called stepped transmission.

The vehicle transmission may include: a transmission case supporting the first bearing and the second bearing; and a transmission cover which overlaps the first middle gear and the second middle gear as viewed from an axial direction of the middle shaft and which is removably attached to the transmission case along the axial direction of the middle shaft.

Thus, since the transmission cover is easy to attach and detach, the first middle gear and the second middle gear can be easily exposed by removing the transmission cover. Thus, the first middle gear and the second middle gear can be easily replaced.

The transmission case may include a tubular portion extending on the distal end side of the middle shaft relative to the first bearing and the second bearing. The first middle gear and the second middle gear may be arranged inside the tubular portion.

Thus, the tubular portion of the transmission case can define the gear chamber that houses the first middle gear and the second middle gear. For example, it is possible to suitably supply oil, etc., to the first middle gear and the second middle gear in the gear chamber.

The vehicle transmission may include a transmission case supporting the first bearing and the second bearing. The transmission case may include a tubular portion extending on the distal end side of the middle shaft relative to the first bearing and the second bearing, and a partition wall that partitions inside of the tubular portion into a gear chamber and an oil passageway. The first middle gear and the second middle gear may be housed in the gear chamber. The oil passageway may connect together a space on one side of an axial direction of the middle shaft relative to the first middle gear and the second middle gear, and a space on the other side of the axial direction of the middle shaft relative to the first middle gear and the second middle gear.

With the configuration described above, in the gear chamber, the rotation of the first middle gear and the second middle gear makes it difficult for oil to flow between the space on one side of the axial direction of the middle shaft and the space on the other side. However, since the vehicle transmission includes the oil passageway partitioned from the gear chamber, oil can be distributed between the space on one side of the axial direction of the middle shaft and the space on the other side without being impeded by the rotation of the first middle gear and the second middle gear.

Oil can be smoothly circulated between these spaces through the oil passageway, and the oil temperature can be made uniform.

The vehicle transmission may include a torque limiter that connects together the middle shaft and a shaft to which power is transmitted from the middle shaft. The torque limiter may include a housing member having a cylindrical portion, a boss member arranged radially inward of the cylindrical portion of the housing member, a ring-shaped first friction plate supported on the cylindrical portion of the housing member, a ring-shaped second friction plate supported on the boss member and opposing the first friction plate, and a biasing member that presses the first friction plate and the second friction plate against each other. A plurality of first recesses and first protrusions may be formed on an outer circumference of the boss portion. A plurality of second protrusions meshing with the plurality of first recesses and a plurality of second recesses meshing with the plurality of first protrusions may be formed on an inner circumference of the second friction plate. The housing member or the boss member may be attached to a portion of the middle shaft that is on the distal end side of the middle shaft relative to the second middle gear. A gap equal to or greater than a predetermined dimension may be provided between the first recesses and the second protrusions and between the first protrusions and the second recesses.

With the configuration described above, since the distal end portion of the middle shaft is cantilevered by the second bearing and the second middle gear is attached to the distal end portion, the distal end portion receives a radial force from the second middle gear. There is a concern that as the distal end portion of the middle shaft flexes, a part of the torque limiter may be subjected to a locally large force and the function of the torque limiter may deteriorate. However, a gap which is equal to or greater than a predetermined dimension is provided between the first recess of the boss member and the second protrusion of the second friction plate and between the first protrusion of the boss member and the second recess of the second friction plate. Because the gap is relatively large, the boss member and the second friction plate can be displaced from each other to some extent, allowing the distal end portion of the middle shaft to flex. Therefore, the flexural stress generated in the distal end portion of the middle shaft can be kept low, and it is possible to suppress a locally large force from being applied to the torque limiter. Therefore, the function of the torque limiter can be well maintained without increasing the diameter of the middle shaft so that the distal end portion does not flex.

The dimension of the gap may be 0.2 mm to 0.6 mm.

The vehicle transmission may include a torque limiter that connects together the middle shaft and a shaft to which power is transmitted from the middle shaft. The torque limiter may include a housing member having a cylindrical portion, a boss member arranged radially inward of the cylindrical portion of the housing member, a ring-shaped first friction plate supported on the cylindrical portion of the housing member, a ring-shaped second friction plate supported on the boss member and opposing the first friction plate, and a biasing member that presses the first friction plate and the second friction plate against each other. A plurality of first recesses and first protrusions may be formed on an outer circumference of the boss portion. A plurality of second protrusions meshing with the plurality of first recesses and a plurality of second recesses meshing with the plurality of first protrusions may be formed on an inner circumference of the second friction plate. The housing member or the boss member may be attached to a portion of the middle shaft that is on the distal end side of the middle shaft relative to the second middle gear. A diameter of the middle shaft may be 20 mm to 40 mm.

With the configuration described above, since the distal end portion of the middle shaft is cantilevered by the second bearing and the second middle gear is attached to the distal end portion, the distal end portion receives a radial force from the second middle gear. However, since the middle shaft is relatively thick, the distal end portion of the middle shaft is unlikely to flex. There is a concern that as the distal end portion of the middle shaft flexes, a locally large force is applied to the torque limiter, but there is little such concern because the distal end portion of the middle shaft is unlikely to flex. Thus, the function of the torque limiter can be well maintained. The middle shaft can stably support the torque limiter.

A vehicle disclosed herein includes: the vehicle transmission set forth above; an internal combustion engine; a wheel; a first power transmission member that connects together the internal combustion engine and the vehicle transmission and which transmits drive force from the internal combustion engine to the vehicle transmission; and a second power transmission member that connects together the vehicle transmission and the wheel and transmits drive force from the vehicle transmission to the wheel.

According to the present invention, it is possible to provide a vehicle transmission with which it is relatively easy to change the reduction ratio by replacing the middle gear, and a vehicle having the same.

DETAILED DESCRIPTION OF THE PREFERRED EMBODIMENTS

Figure 1:
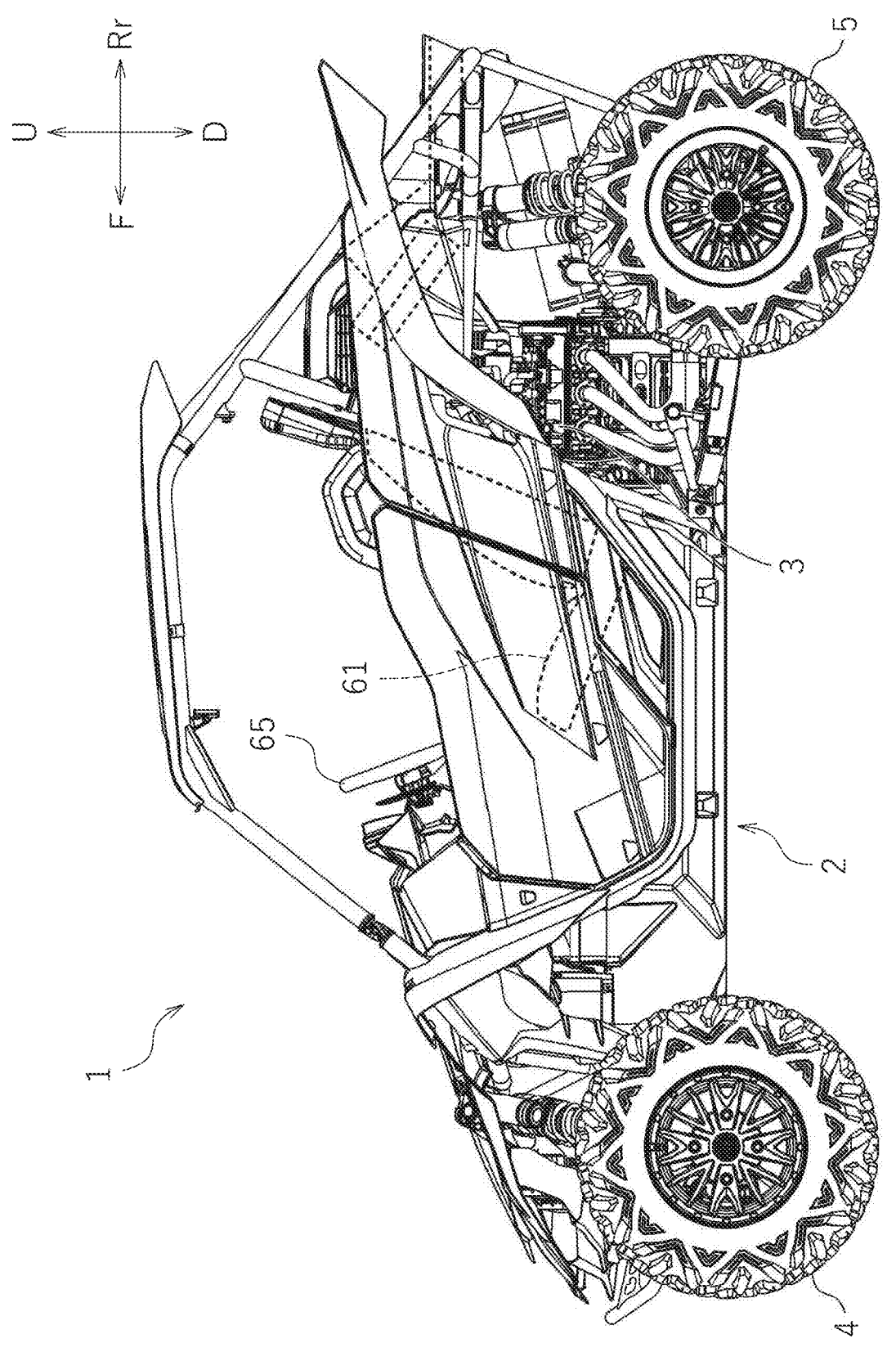
FIG. 1 is a left side view of a vehicle according to one embodiment.
Figure 2:
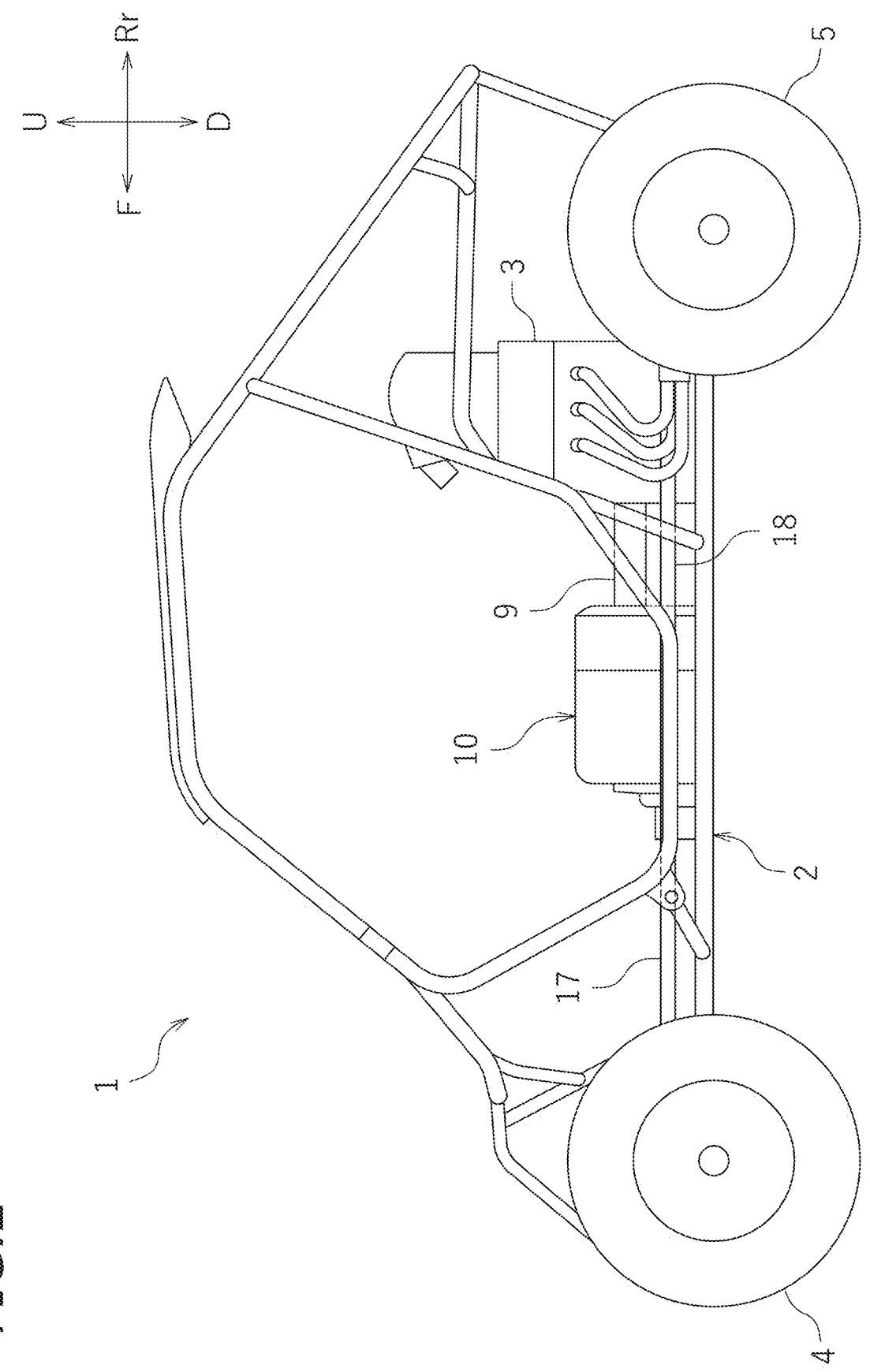
FIG. 2 is a left side view showing some parts of the vehicle.

A vehicle transmission and a vehicle according to one embodiment will now be described with reference to the drawings. FIG. 1 is a left side view of a vehicle 1 according to the present embodiment. FIG. 2 is a left side view of the vehicle 1 schematically showing some parts of the vehicle 1. In the following description, the designations F, Rr, L, R, U and D, as used in the figures, refer to front, rear, left, right, up and down, respectively.

The vehicle 1 is a vehicle capable of traveling over rough terrain, a so-called ROV (Recreational Off-highway Vehicle). An ROV is a four-wheeled vehicle including a plurality of seats 61 arranged in the vehicle width direction and a steering wheel 65. However, the vehicle in which a vehicle transmission (hereinafter referred to simply as "transmission") according to the present embodiment is installed may alternatively be a straddled four-wheeled vehicle having a steering bar. That is, the vehicle may be an ATV (All Terrain Vehicle). The vehicle may also be a vehicle other than an ROV and an ATV.

The vehicle 1 includes a vehicle body frame 2. The seats 61 are supported on the vehicle body frame 2. A pair of left and right front wheels 4 and a pair of left and right rear wheels 5 are supported on the vehicle body frame 2. An internal combustion engine (hereinafter referred to as "engine") 3 is attached to the vehicle body frame 2. As shown in FIG. 2, a transmission 10 is attached to the vehicle body frame 2. The transmission 10 is arranged rearward of the front wheels 4 and forward of the rear wheels 5. The transmission 10 is arranged forward of the engine 3. The transmission 10 and the engine 3 are connected together by a transmission shaft 9 that transmits the drive force of the engine 3 to the transmission 10. The transmission shaft 9 is an example of the first power transmission member that transmits the drive force of the engine 3 to the transmission 10.

Figure 3:
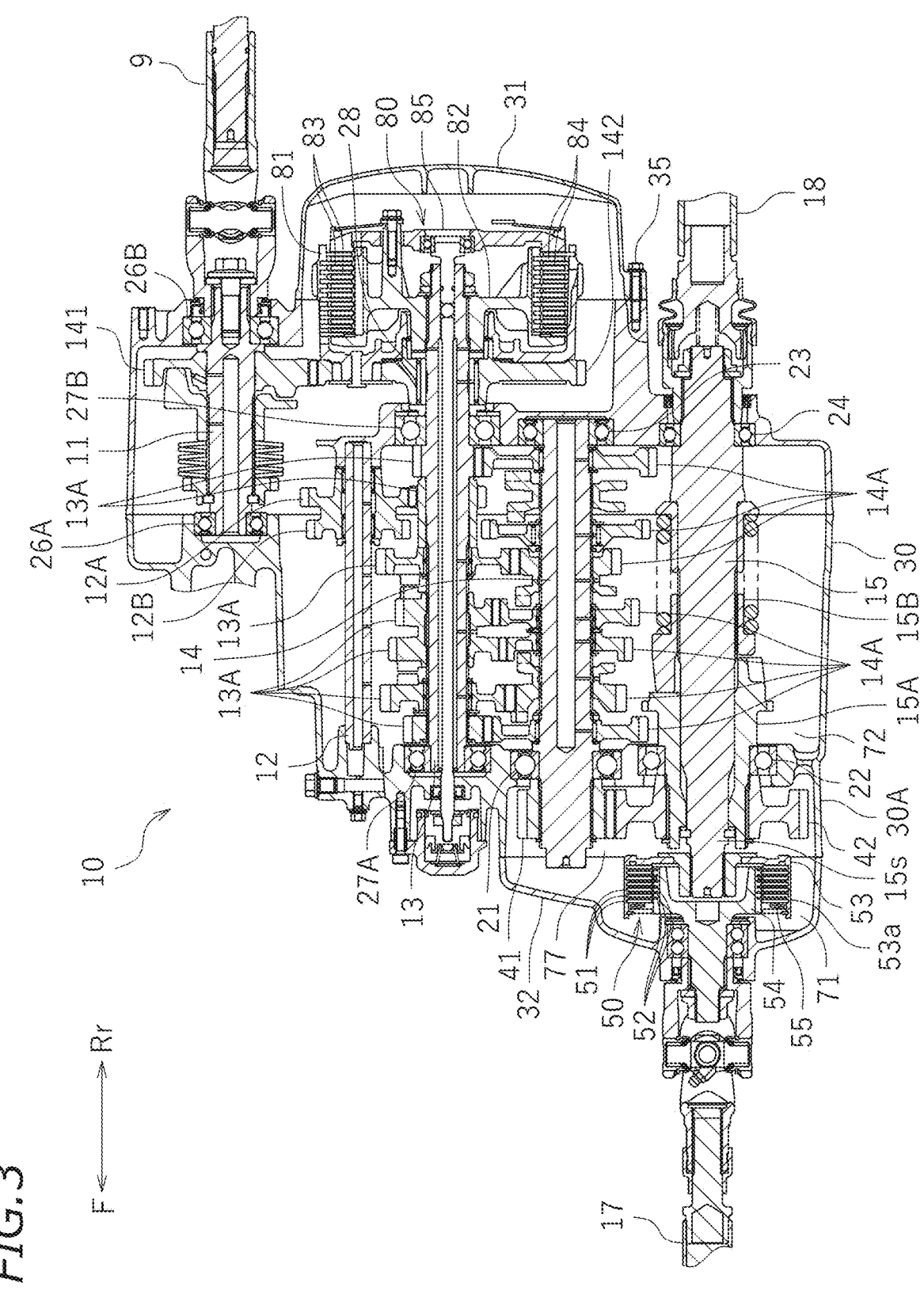
FIG. 3 is a cross-sectional view of a vehicle transmission.

FIG. 3 is a cross-sectional view showing the internal configuration of the transmission 10. The transmission 10 includes an input shaft 11, a counter shaft 12, a main shaft 13, a drive shaft 14 and a middle shaft 15. The input shaft 11, the counter shaft 12, the main shaft 13, the drive shaft 14 and the middle shaft 15 are arranged parallel to each other and each extend in the vehicle front-rear direction. The transmission 10 also includes a clutch 80 and a torque limiter 50. The transmission 10 includes a transmission case 30, a clutch cover 31 removably attached to the transmission case 30, and a transmission cover 32 removably attached to the transmission case 30. Here, the clutch cover 31 and the transmission cover 32 are fixed to the transmission case 30 by a bolt 35.

The input shaft 11 is connected to the transmission shaft 9. The drive force of the engine 3 is input to the input shaft 11. Bearings 26A, 26B are attached to the transmission case 30. The front end portion of the input shaft 11 is rotatably supported on the bearing 26A. The rear end portion of the input shaft 11 is rotatably supported on the bearing 26B.

Bearings 27A, 27B are also attached to the transmission case 30. The front end portion of the main shaft 13 is rotatably supported on the bearing 27A. The rear end portion of the main shaft 13 is rotatably supported on the bearing 27B.

The clutch 80 is attached to the rear end portion of the main shaft 13. While there is no limitation on the form of the clutch 80, it is a multi-plate friction clutch in the present embodiment. Since the configuration of the clutch 80 is well known in the art, a detailed description thereof is omitted herein. The clutch 80 includes a clutch housing 81, a clutch boss 82, a plurality of friction plates 83 supported on the clutch housing 81, a plurality of friction plates 84 supported on the clutch boss 62, and a pressure plate 85 that crimps the friction plates 83 and the friction plates 84. The clutch housing 81 is rotatable relative to the main shaft 13, and the clutch boss 82 is non-rotatable relative to the main shaft 13. The clutch housing 81 is rotatably supported on a portion of the main shaft 13 that is rearward of the bearing 27B via a needle bearing 28. The clutch boss 82 is fixed to a portion of the main shaft 13 rearward of the needle bearing 28 in main shaft 13 by a spline. The clutch boss 82 rotates together with the main shaft 13.

A gear 141 is attached to the input shaft 11 so that power can be transmitted therebetween. A gear 142 is provided on the clutch housing 81. The gear 141 and the gear 142 are meshed with each other. The torque of the input shaft 11 is transmitted to the clutch housing 81 via the gear 141 and the gear 142. When the clutch 80 is connected, the torque of the clutch housing 81 is transmitted to the clutch boss 82 via the friction plate 83 and the friction plate 84. The torque of the clutch boss 82 is transmitted to the main shaft 13. When the clutch 80 is connected, the main shaft 13 rotates together with the input shaft 11.

The drive shaft 14 is the shaft to which the shifted torque is transmitted. A bearing 21 and a bearing 23 are attached to the transmission case 30. While there is no particular limitation on the form of the bearing 21 and the bearing 23, they are herein ball bearings. The front end portion of the drive shaft 14 is rotatably supported on the bearing 21. The rear end portion of the drive shaft 14 is rotatably supported on the bearing 23.

The transmission 10 according to the present embodiment is a stepped transmission. A plurality of gears (i.e., first gears) 13A are attached to the main shaft 13. A plurality of gears (i.e. second gears) 14A, which mesh with the gears 13A, are attached to the drive shaft 14. The gears 14A are attached to a portion of the drive shaft 14 between the bearing 21 and the bearing 23. The main shaft 13, the drive shaft 14, the gears 13A and the gears 14A together form a so-called dog-clutch stepped transmission mechanism. The drive force is transmitted from the main shaft 13 to the drive shaft 14 through any one set of gears 13A and 14A. The reduction ratios of the plurality of sets of gears 13A and 14A are different from each other. The reduction ratio can be changed by changing the combination of the gears 13A, 14A that transmit the drive force.

A gear 12A and a gear 12B are attached to the counter shaft 12. The gear 12A and the gear 12B are formed integrally. The gear 12A is meshed with one of the plurality of gears 13A. The gear 12B is meshed with one of the plurality of gears 14A. By transmitting the drive force of the main shaft 13 to the drive shaft 14 via the gears 12A and 12B, it is possible to rotate the drive shaft 14 in reverse. This allows the vehicle 1 to move backward.

A bearing 22 and a bearing 24 are attached to the transmission case 30. While there is no particular limitation on the bearing 22 and the bearing 24, they are herein ball bearings. The front end portion of the middle shaft 15 is rotatably supported on the bearing 22. The rear end portion of the middle shaft 15 is rotatably supported on the bearing 24.

A first middle gear 41 is attached to a portion of the drive shaft 14 that is on the distal end side relative to the bearing 21 (hereinafter referred to as "the first bearing 21"). The first middle gear 41 is arranged forward relative to the first bearing 21. Here, the first middle gear 41 and the drive shaft 14 are coupled together by a spline. Although not shown in the figures, a plurality of recesses and protrusions are formed on the inner circumference of the first middle gear 41. Protrusions that engage with the recesses of the first middle gear 41 and recesses that engage with the protrusions of the first middle gear 41 are formed on the outer circumference of the drive shaft 14. The first middle gear 41 can slide against the drive shaft 14 in the axial direction of the drive shaft 14 (herein, in the vehicle front-rear direction). The first middle gear 41 is removably attached to the drive shaft 14.

A second middle gear 42 is attached to a portion of the middle shaft 15 that is on the distal end side relative to the bearing 22 (hereinafter referred to as "the second bearing 22"). The second middle gear 42 is arranged forward relative to the second bearing 22. Here, the second middle gear 42 and the middle shaft 15 are coupled together by a spline. Specifically, the second middle gear 42 and the middle shaft 15 are indirectly spline-coupled via the cam dampers 15A, 15B. Although not shown in the figures, a plurality of recesses and protrusions are formed on the inner circumference of the second middle gear 42. Protrusions that engage with the recesses of the second middle gear 42 and recesses that engage with the protrusions of the second middle gear 42 are formed on the outer circumference of the cam damper 15A. The second middle gear 42 can slide against the middle shaft 15 in the axial direction of the middle shaft 15 (herein, in the vehicle front-rear direction). The second middle gear 42 is removably attached to the middle shaft 15.

In the present embodiment, the first middle gear 41 and the second middle gear 42 are meshed with each other. Note however that the first middle gear 41 and the second middle gear 42 may each be a sprocket and may be linked to each other via a chain (not shown). Drive force is transmitted from the drive shaft 14 to the middle shaft 15 via the first middle gear 41 and the second middle gear 42. The diameter of the second middle gear 42 is larger than the diameter of the first middle gear 41. Therefore, the rotational speed of the middle shaft 15 is smaller than the rotational speed of the drive shaft 14. The rotation of the drive shaft 14 is reduced and transmitted to the middle shaft 15.

While there is no particular limitation, the first middle gear 41 and the second middle gear 42 are arranged rearward relatively to the front end of the transmission case 30 and forward relatively to the rear end of the transmission case 30 in the present embodiment. The first middle gear 41 and the second middle gear 42 are arranged rearward relative to the rear end of the transmission cover 32. The first middle gear 41 and the second middle gear 42 are housed in the transmission case 30. As viewed from the direction perpendicular to the middle shaft 15 (e.g., the vehicle left-right direction), the first middle gear 41 and the second middle gear 42 overlap the transmission case 30.

The front end portion of the middle shaft 15 is connected to a front drive shaft 17 (which is an example of a wheel-driving shaft) and the rear end portion of the middle shaft 15 is connected to a rear drive shaft 18. The front drive shaft 17 is connected to the front wheels 4. The drive force of the middle shaft 15 is transmitted to the front wheels 4 via the front drive shaft 17. The rear drive shaft 18 is connected to the rear wheels 5. The drive force of the middle shaft 15 is transmitted to the rear wheels 5 via the rear drive shaft 18. The front drive shaft 17 transmits the drive force of the transmission 10 to the front wheels 4, and the rear drive shaft 18 transmits the drive force of the transmission 10 to the rear wheels 5. The front drive shaft 17 and the rear drive shaft 18 are each an example of "the second power transmission member".

The torque limiter 50 according to the present embodiment is a wet multi-disc torque limiter. The torque limiter 50 is present between the middle shaft 15 and the front drive shaft 17. The middle shaft 15 is connected to the front drive shaft 17 via the torque limiter 50.

The torque limiter 50 includes a housing member 53, a boss member 54, a plurality of first friction plates 51, a plurality of second friction plates 52 and a spring 55 as a biasing member. The housing member 53 is attached to a portion of the middle shaft 15 that is on the distal end side relative to the second middle gear 42. The boss member 54 is connected to the front drive shaft 17. The housing member 53 includes a cylindrical portion 53a having a cylindrical shape. The boss member 54 is arranged radially inward of the cylindrical portion 53a. The first friction plates 51 are formed in a ring shape and supported on the cylindrical portion 53a. The second friction plates 52 are formed in a ring shape and supported on the boss member 54. The first friction plates 51 and the second friction plates 52 are arranged alternating with each other in the axial direction of the middle shaft 15 and oppose each other. The spring 55 presses the first friction plates 51 and the second friction plates 52 against each other. When the torque transmitted between the middle shaft 15 and the front drive shaft 17 is less than or equal to a predetermined value, the torque is transmitted between the middle shaft 15 and the front drive shaft 17 by the frictional force between the first friction plates 51 and the second friction plates 52. When the torque transmitted between the middle shaft 15 and the front drive shaft 17 exceeds the predetermined value, the first friction plates 51 slip against the second friction plates 52 and the torque transmitted between the middle shaft 15 and the front drive shaft 17 is reduced. The torque limiter 50 suppresses the torque transmitted between the middle shaft 15 and the front drive shaft 17 to be less than or equal to the predetermined value.

Figure 4:
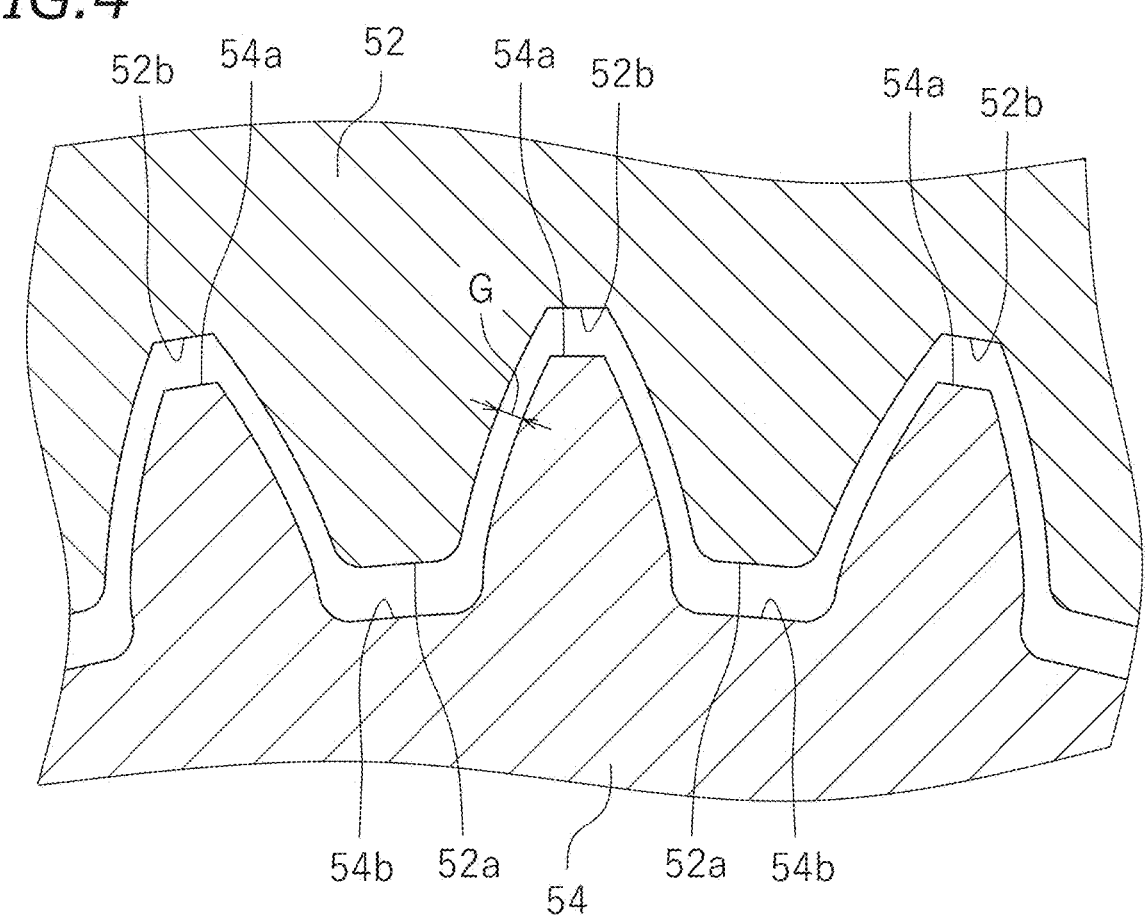
FIG. 4 is a partially enlarged cross-sectional view of a torque limiter.

FIG. 4 is a partially enlarged cross-sectional view of the torque limiter 50. As shown in FIG. 4, the boss member 54 and the second friction plate 52 are coupled together by a spline. Specifically, a plurality of first protrusions 54a and a plurality of first recesses 54b are formed on the outer circumference of the boss member 54. A plurality of second protrusions 52a and a plurality of second recesses 52b are formed on the inner circumference of the second friction plate 52. The first protrusions 54a of the boss member 54 mesh with the second recesses 52b of the second friction plate 52, and the first recesses 54b of the boss member 54 mesh with the second protrusions 52a of the second friction plate 52. Here, the gap G equal to or greater than a predetermined dimension is provided between the first recess 54b and the second protrusion 52a, and between the first protrusion 54a and the second recess 52b. The dimension of the gap G is set larger than the dimension of the gap of conventional torque limiters. While there is no particular limitation on the dimension of the gap G, it is, for example, 0.2 mm to 0.6 mm. The gap G may be 0.3 mm to 0.5 mm. Note that while the gap G, as used herein, refers to the average value of the gap, the dimension of the gap at a predetermined location may be within the above numerical range, and the maximum value of the gap may be within the above numerical range.

Although not shown in the figures, the housing member 53 and the first friction plates 51 are also coupled by a spline. The housing member 53 is coupled to the middle shaft 15 by a spline.

Figure 5:
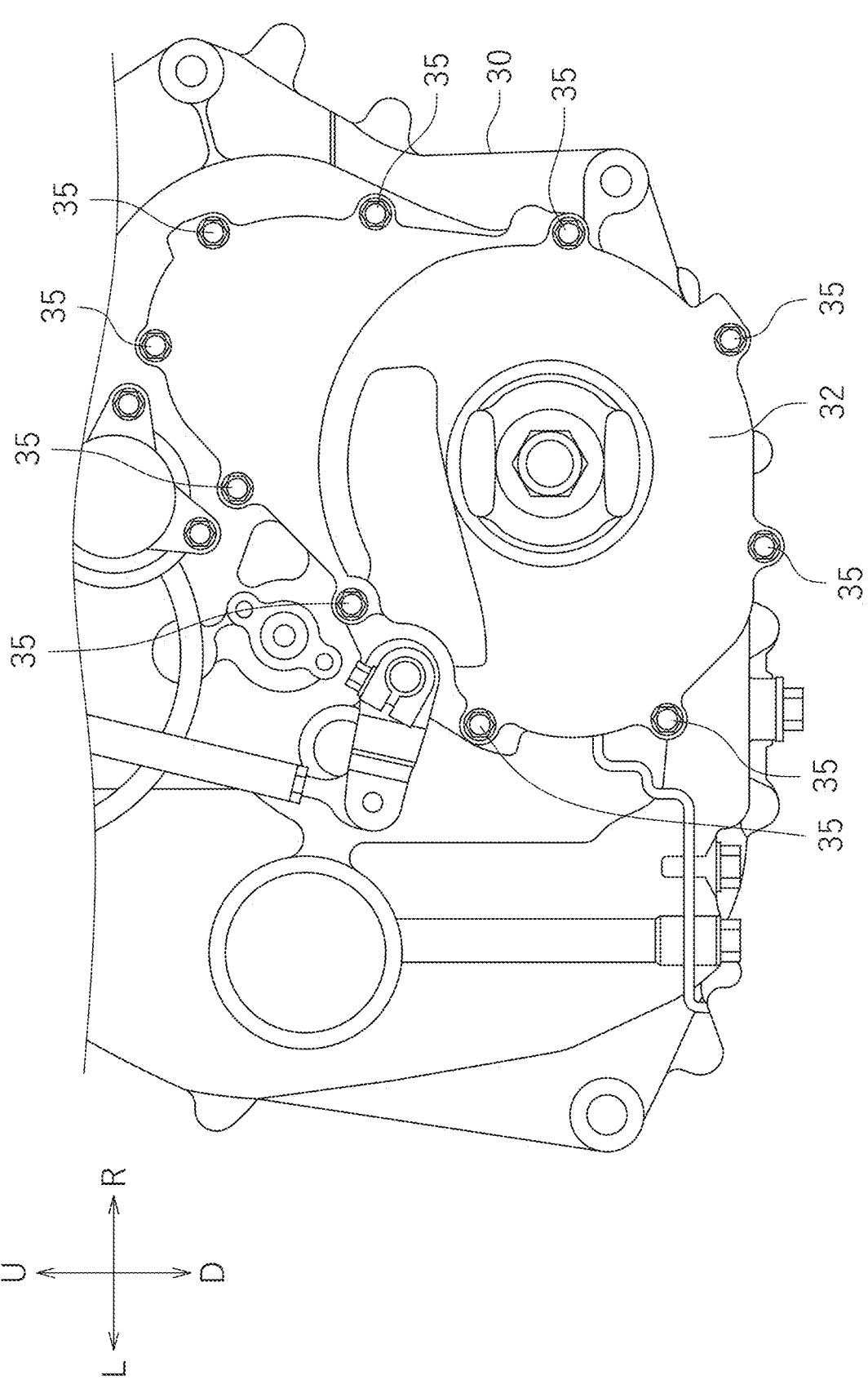
FIG. 5 is a front view of a part of the vehicle transmission.
Figure 6:
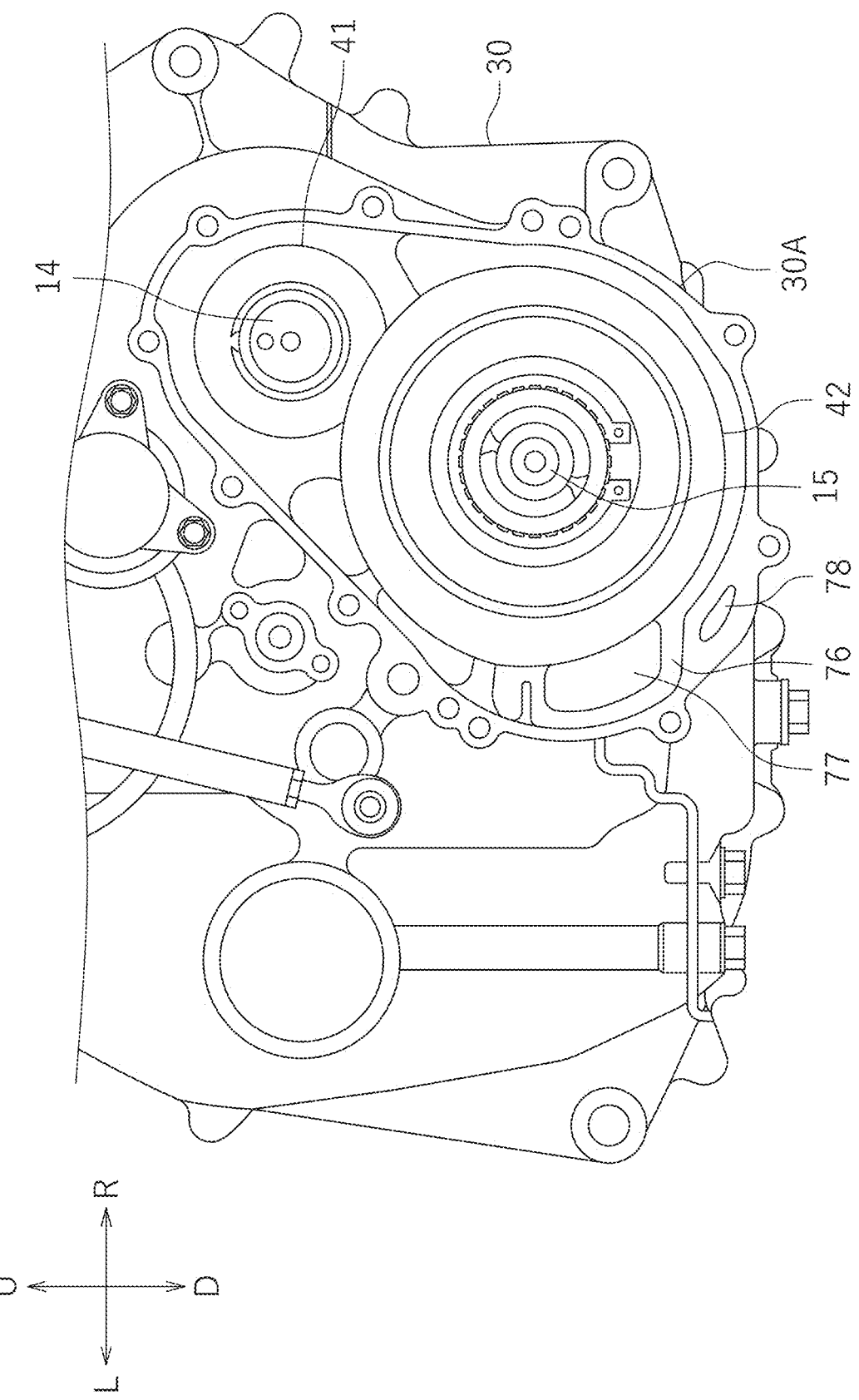
FIG. 6 is a front view of a part of the vehicle transmission with the transmission cover removed.

As mentioned above, the transmission cover 32 is secured to the transmission case 30 by bolts 35. By removing the bolts 35, the transmission cover 32 can be easily removed from the transmission case 30. FIG. 5 is a front view of a part of the transmission 10. FIG. 6 is a front view of this part of the transmission 10 with the transmission cover 32 removed. The torque limiter 50 can be removed from the middle shaft 15 by removing the bolts 35 and moving the transmission cover 32 forward. When the transmission cover 32 is removed, the first middle gear 41 and the second middle gear 42 are exposed to the outside. By pulling the first middle gear 41 forward, the first middle gear 41 can be removed from the drive shaft 14. By pulling the second middle gear 42 forward, the second middle gear 42 can be removed from the middle shaft 15.

Oil is present inside the transmission 10. Oil lubricates various parts of the transmission 10. Oil lubricates, for example, the gears 13A, the gears 14A, the first middle gear 41, the second middle gear 42, the torque limiter 50, etc. Now, if oil stagnates in a particular location of the transmission 10, there is a possibility that the temperature of the stagnant oil may become high, and the location may not be lubricated well. It is preferable that oil does not stagnate at a specific location in the transmission 10 so as to decrease the variation in temperature distribution of oil inside the transmission 10.

As shown in FIG. 3, with the transmission 10 according to the present embodiment, the first middle gear 41 and the second middle gear 42 are arranged between the torque limiter 50 and the gears 13A, 14A of the stepped transmission mechanism. Defined inside the transmission 10 are a space (hereinafter referred to as "the first space") 71 on the distal end side of the middle shaft 15 relative to the first middle gear 41 and the second middle gear 42, and a space (hereinafter referred to as "the second space") 72 that is on the center side of the middle shaft 15 relative to the first middle gear 41 and the second middle gear 42. Note that the distal end side of the middle shaft 15 refers to the side away from the middle position of the middle shaft 15 in the axial direction. The center side of the middle shaft 15 refers to the side toward the middle position in the axial direction of the middle shaft 15. Here, the first space 71 is formed forward of the first middle gear 41 and the second middle gear 42, and the second space 72 is formed rearward of the first middle gear 41 and the second middle gear 42. The torque limiter 50 is housed in the first space 71. The gears 13A, 14A of the stepped transmission mechanism are housed in the second space 72.

The transmission case 30 includes a tubular portion 30A extending on the distal end side of the middle shaft 15 relative to the first bearing 21 and the second bearing 22. A gear chamber 77 that houses the first middle gear 41 and the second middle gear 42 is defined inside the tubular portion 30A. The first space 71 and the second space 72 are connected with each other through the gear chamber 77. The first space 71 and the second space 72 are connected with each other through the gap between the first middle gear 41 and the inner wall surface of the tubular portion 30A of the transmission case 30 and the gap between the second middle gear 42 and the inner wall surface of the tubular portion 30A. Therefore, oil can flow from the first space 71 to the second space 72 or from the second space 72 to the first space 71. However, since the first middle gear 41 and the second middle gear 42 rotate at a relatively high speed, the flow of oil between the first space 71 and the second space 72 is impeded by the first middle gear 41 and the second middle gear 42. Since it is difficult for oil to circulate in the first space 71 and the second space 72, there is a concern that oil may stagnate in the second space 72.

Figure 7:
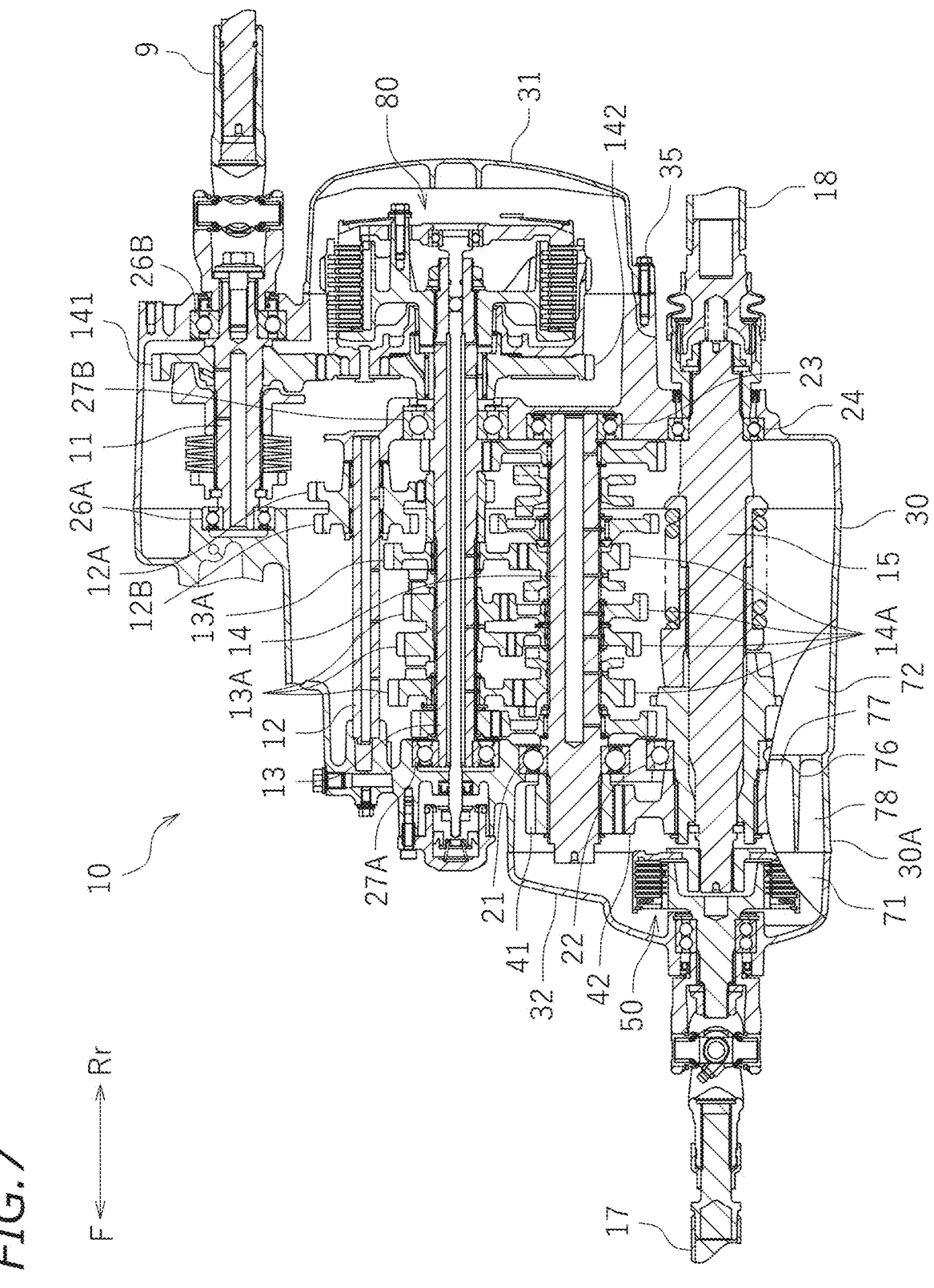
FIG. 7 is a cross-sectional view of the vehicle transmission.
Figure 8:
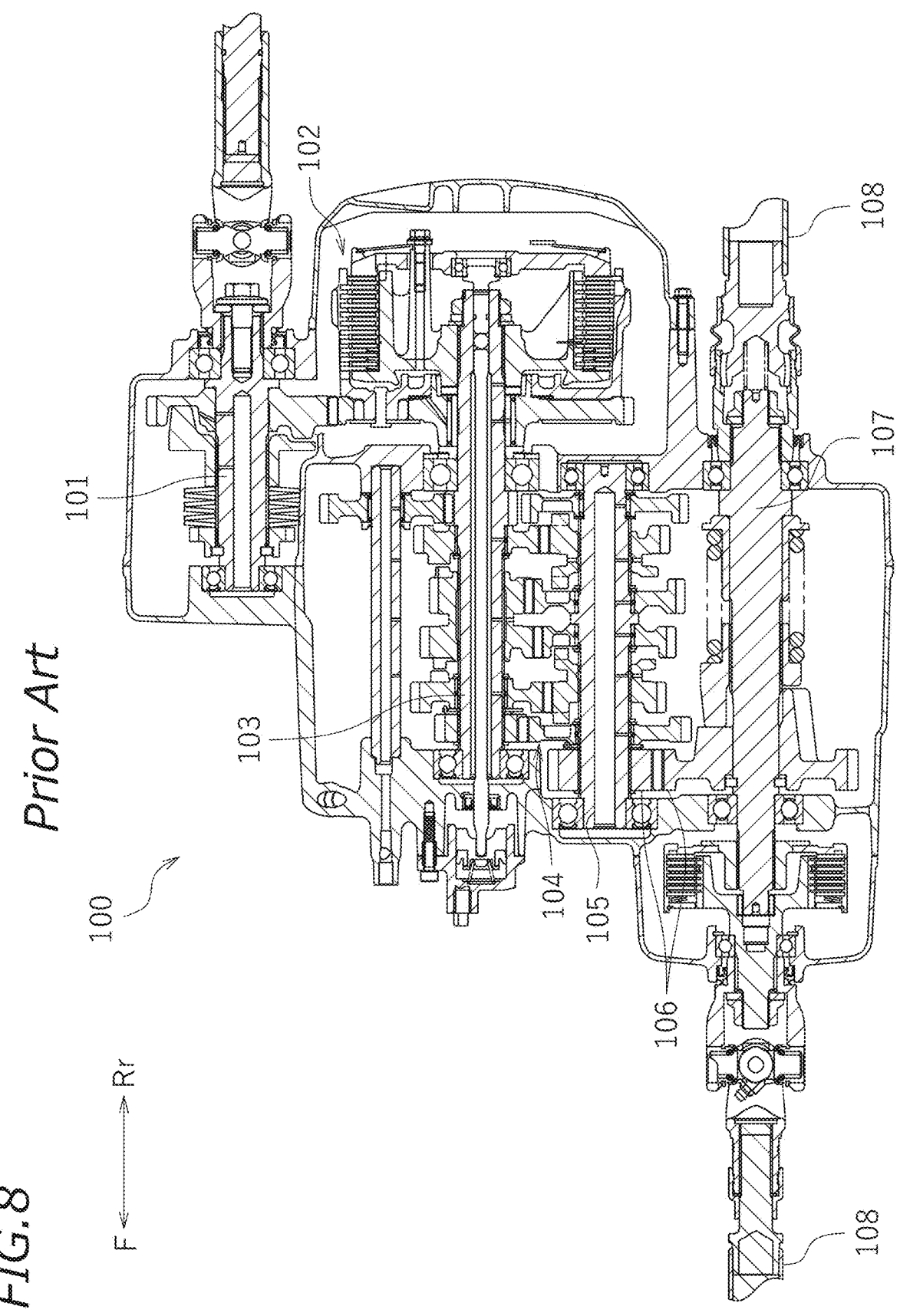
FIG. 8 is a cross-sectional view of a conventional vehicle transmission.

Therefore, the transmission 10 according to the present embodiment includes an oil passageway 78 that connects together the first space 71 and the second space 72 as shown in FIG. 6 and FIG. 7. The transmission case 30 includes a partition wall 76 that partitions the inside of the tubular portion 30A into the gear chamber 77 and the oil passageway 78. The oil passageway 78 is partitioned by the partition wall 76 from the first middle gear 41 and the second middle gear 42. Therefore, oil flowing in the oil passageway 78 is less affected by the rotation of the first middle gear 41 and the second middle gear 42. Since oil is not hindered by the rotation of the first middle gear 41 and the second middle gear 42, oil can easily flow from the first space 71 to the second space 72 or from the second space 72 to the first space 71 through the oil passageway 78. Thus, oil is less likely to stagnate in the second space 72.

The transmission 10 is configured as described above. With the vehicle 1, there may be cases where the front wheels 4 and the rear wheels 5 are replaced with other front wheels and other rear wheels having different outer diameters, depending on the driving environment and the like. In such cases, it may be desired to change the reduction ratio of the transmission 10. That is, while the reduction ratio of the transmission 10 can be changed within a predetermined range, there are cases in which it is desirable to change the predetermined range. For example, one may wish to change the reduction ratio of the first gear or the highest gear. In such a case, another first middle gear and another second middle gear with different gear ratios from the first middle gear 41 and second middle gear 42 are prepared, and the first middle gear 41 and second middle gear 42 are replaced as follows.

First, the bolts 35 are removed, and the transmission cover 32 is removed forward from the transmission case 30. This exposes the first middle gear 41 and the second middle gear 42 (see FIG. 6). Next, the first middle gear 41 is pulled out forward from the drive shaft 14 and the second middle gear 42 is pulled out forward from the middle shaft 15. Thereafter, the other first middle gear is fitted to the drive shaft 14 and the other second middle gear is fitted to the middle shaft 15. Then, the transmission cover 32 is placed over the transmission case 30, and the transmission cover 32 is fixed to the transmission case 30 by the bolts 35. In this way, it is possible to replace the first middle gear and the second middle gear, and to change the reduction ratio of the transmission 10.

Note that if the first middle gear 41 and the second middle gear 42 are each a sprocket and are connected to each other via a chain, the reduction ratio of the transmission 10 can be changed by replacing at least one sprocket and the chain.

The various effects brought about by the present embodiment will now be described.

With the transmission 10 according to the present embodiment, as shown in FIG. 3, the first middle gear 41 is attached to a portion of the drive shaft 14 that is on the distal end side relative to the first bearing 21, and the second middle gear 42 is attached to a portion of the middle shaft 15 that is on the distal end side relative to the second bearing 22. By pulling out the first middle gear 41 toward the distal end side of the drive shaft 14, the first middle gear 41 can be removed without removing the first bearing 21. By pulling out the second middle gear 42 toward the distal end side of the middle shaft 15, the second middle gear 42 can be removed without removing the second bearing 22. Thus, the transmission case 30 does not need to be disassembled, and the first middle gear 41 and the second middle gear 42 can be replaced relatively easily. The first middle gear 41 and the second middle gear 42 can be replaced without removing the transmission 10 from the vehicle 1. Therefore, with the transmission 10 according to the present embodiment, the reduction ratio can be changed relatively easily without trouble or cost.

Now, with a continuously variable transmission, the reduction ratio can be adjusted arbitrarily between the minimum reduction ratio and the maximum reduction ratio. With a vehicle having a continuously variable transmission, when the front wheels 4 and the rear wheels 5 are replaced, it is possible to set a reduction ratio adapted to the dimensions of the new front wheels 4 and the new rear wheels 5 within a predetermined range between the minimum reduction ratio and the maximum reduction ratio. On the other hand, the transmission 10 according to the present embodiment is a stepped transmission. With a stepped transmission, the reduction ratio can only be adjusted in a predetermined number of steps. As the front wheels 4 and the rear wheels 5 are replaced, the reduction ratios of different gears may deviate uniformly from those adapted to the dimensions of the new front wheels 4 and the new rear wheels 5. There is a possibility that the reduction ratios may not be suitable even for gears other than the first gear and the highest gear. Therefore, with a stepped transmission, the effect of being able to change the reduction ratio relatively easily is significant.

According to the present embodiment, the transmission 10 includes the transmission cover 32 which overlaps the first middle gear 41 and the second middle gear 42 as viewed from the axial direction of the middle shaft 15 and which is removably attached to the transmission case 30 toward the axial direction of the middle shaft 15. Since the transmission cover 32 is easy to attach and detach, the first middle gear 41 and the second middle gear 42 can be easily exposed by removing the transmission cover 32. Thus, the first middle gear 41 and the second middle gear 42 can be easily replaced.

According to the present embodiment, the transmission case 30 includes the tubular portion 30A extending on the distal end side of the middle shaft 15 relative to the first bearing 21 and the second bearing 22, and the first middle gear 41 and the second middle gear 42 are arranged inside the tubular portion 30A. The tubular portion 30A can define the gear chamber 77 that houses the first middle gear 41 and the second middle gear 42. It is possible to suitably supply oil, etc., to the first middle gear 41 and the second middle gear 42 in the gear chamber 77.

According to the present embodiment, the transmission 10 includes the oil passageway 78 partitioned from the gear chamber 77. Oil can be distributed between the first space 71 and the second space 72 without being impeded by the rotation of the first middle gear 41 and the second middle gear 42. Oil can be smoothly circulated through the oil passageway 78. Therefore, it is possible to prevent oil from stagnating in the second space 72. The oil temperature can be made uniform in the first space 71 and in the second space 72.

According to the present embodiment, the middle shaft 15 includes a distal end portion 15s located on the distal end side of the middle shaft 15 relative to the second bearing 22, and the distal end portion 15s is cantilevered by the second bearing 22. Since the second middle gear 42 is attached to the distal end portion 15s, the distal end portion 15s receives a radial force from the second middle gear 42. Therefore, there is a concern that the distal end portion 15s may flex. The wet multi-disc torque limiter 50 is attached to the distal end portion 15s. There is a possibility that a part of the torque limiter 50 may be subjected to a locally large force and the function of the torque limiter 50 may deteriorate. However, according to the present embodiment, as shown in FIG. 4, the gap G which is equal to or greater than a predetermined dimension is provided between the first recesses 54b of the boss member 54 of the torque limiter 50 and the second protrusions 52a of the second friction plate 52. The gap G which is equal to or greater than a predetermined dimension is also provided between the first protrusions 54a of the boss member 54 and the second recesses 52b of the second friction plate 52. Because the gap G is relatively large, the boss member 54 and the second friction plate 52 can be displaced from each other to some extent. This allows the distal end portion 15s of the middle shaft 15 to flex to some extent, so that the gap G can absorb the flexure of the distal end portion 15s of the middle shaft 15. Therefore, the flexural stress generated in the distal end portion 15s of the middle shaft 15 can be kept low, and it is possible to suppress a locally large force from being applied to the torque limiter 50. Therefore, the function of the torque limiter 50 can be well maintained without increasing the diameter of the middle shaft 15 so that the distal end portion 15s does not flex. Since the middle shaft 15 can be made smaller in diameter, the transmission 10 can be made smaller in size.

While the transmission 10 and the vehicle 1 according to one embodiment have been described above, the embodiment described above is merely illustrative, and various other embodiments are possible. Examples of other embodiments will now be briefly described.

In the embodiment described above, the gap G between the boss member 54 of the torque limiter 50 and the second friction plate 52 is made relatively large so that the function of the torque limiter 50 can be secured even if the distal end portion 15s of the middle shaft 15 flexes to some extent. However, needless to say, it is also possible to secure the function of the torque limiter 50 by suppressing the flexure of the distal end portion 15s of the middle shaft 15. The transmission 10 according to one other embodiment includes a relatively thicker middle shaft 15 than in the embodiment described above. While there is no particular limitation on the diameter of the middle shaft 15, it is 20 mm to 40 mm, and it may be 25 mm to 35 mm, for example. Thus, by increasing the diameter of the middle shaft 15, it is possible to suppress the flexure of the distal end portion 15s of the middle shaft 15. Since it is possible to suppress the application of a locally large force to the torque limiter 50, the function of the torque limiter 50 can be well maintained. Note that the dimension of the gap G between the boss member 54 of the torque limiter 50 and the second friction plate 52 may be generally equal to the dimension of the embodiment described above or may be smaller than the dimension of the embodiment described above.

Changing the reduction ratio of the transmission 10 is not limited to when replacing the front wheels 4 and the rear wheels 5. Even if the front wheels 4 and the rear wheels 5 are not replaced, the reduction ratio can be changed to increase the maximum speed or increase the drive force.

While the housing member 53 of the torque limiter 50 is connected to the middle shaft 15 and the boss member 54 is connected to the front drive shaft 17 in the embodiment described above, the arrangement of the housing member 53 and boss member 54 may be reversed. That is, the boss member 54 may be connected to the middle shaft 15 and the housing member 53 may be connected to the front drive shaft 17.

While the transmission 10 according to the embodiment described above is a stepped transmission having a stepped transmission mechanism, the vehicle transmission may be a continuously variable transmission. For example, the vehicle transmission may be a belt-type continuously variable transmission (CVT).

The torque limiter 50 is not limited to a wet multi-disc torque limiter. The torque limiter 50 is not always necessary and can be omitted.

The first bearing 21 and the second bearing 22 are not limited to ball bearings. The first bearing 21 and the second bearing 22 may be other forms of bearings such as needle bearings. The first bearing 21 and the second bearing 22 may be bearings of the same type or bearings of different types.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

What is claimed is:

1. A vehicle transmission, comprising:
a drive shaft configured to receive a shifted torque;
a middle shaft arranged in parallel to the drive shaft;
a first bearing that rotatably supports the drive shaft;
a second bearing that rotatably supports the middle shaft;
a first middle gear attached to a portion of the drive shaft that is on a further distal side of the drive shaft than the first bearing;
a second middle gear attached to a portion of the middle shaft that is on a further distal side of the middle shaft than the second bearing, the second middle gear being connected to the first middle gear;
a transmission case supporting the first bearing and the second bearing, wherein:
the transmission case includes:
a tubular portion extending from another portion of the middle shaft that is on the further distal side of the middle shaft than the first bearing and the second bearing, the tubular portion being on an outer side of the first middle gear and the second middle gear in a radial direction of the middle shaft, and
a partition wall that partitions an inside of the tubular portion into a gear chamber and an oil passageway, the oil passageway being on the outer side of the gear chamber in the radial direction, with the partition wall located therebetween and separating the oil passageway from the first middle gear and the second middle gear in the radial direction along the tubular portion;
the first middle gear and the second middle gear are housed in the gear chamber;
the transmission has therein:
a first space that is a space on the further distal side of the middle shaft than the first middle gear and the second middle gear, and
a second space that is a space on a further center side of the middle shaft than the first middle gear and the second middle gear; and
the oil passageway connects the first space and the second space.

2. The vehicle transmission according to claim 1, further comprising:
a main shaft arranged in parallel to the drive shaft;
a plurality of first gears attached to the main shaft; and
a plurality of second gears attached to the drive shaft and meshing with the plurality of first gears, respectively.

3. The vehicle transmission according to claim 1, further comprising:
a transmission cover which overlaps the first middle gear and the second middle gear as viewed in an axial direction of the middle shaft, and which is removably attached to the transmission case and extends in the axial direction of the middle shaft.

4. The vehicle transmission according to claim 1, further comprising:
a wheel-driving shaft that receives power from the middle shaft; and
a torque limiter that connects the middle shaft and the wheel-driving shaft, wherein:
the torque limiter includes:
a housing member having a cylindrical portion,
a boss member arranged inside the cylindrical portion of the housing member,
a ring-shaped first friction plate supported by the cylindrical portion of the housing member,
a ring-shaped second friction plate supported by the boss member, and
a biasing member that presses the first friction plate and the second friction plate against each other;
the boss portion has, on an outer circumference thereof, a plurality of first recesses and a plurality of first protrusions;
the second friction plate has, on an inner circumference thereof, a plurality of second protrusions meshing with the plurality of first recesses, and a plurality of second recesses meshing with the plurality of first protrusions;
the housing member or the boss member is attached to another portion of the middle shaft that is on the further distal side of the middle shaft than the second middle gear; and
a gap is provided between the first recesses and the second protrusions and between the first protrusions and the second recesses.

5. The vehicle transmission according to claim 4, wherein the gap has a width of 0.2 mm to 0.6 mm.

6. The vehicle transmission according to claim 1, further comprising:
a wheel-driving shaft that receives power from the middle shaft; and
a torque limiter that connects the middle shaft and the wheel-driving shaft, wherein:
the torque limiter includes:
a housing member having a cylindrical portion,
a boss member arranged inside the cylindrical portion of the housing member,
a ring-shaped first friction plate supported by the cylindrical portion of the housing member,
a ring-shaped second friction plate supported by the boss member, and
a biasing member that presses the first friction plate and the second friction plate against each other;
the boss portion has, on an outer circumference thereof, a plurality of first recesses and a plurality of first protrusions;
the second friction plate has, on an inner circumference thereof, a plurality of second protrusions meshing with the plurality of first recesses, and a plurality of second recesses meshing with the plurality of first protrusions;
the housing member or the boss member is attached to another portion of the middle shaft that is on the further distal side of the middle shaft than the second middle gear; and
a diameter of the middle shaft is 20 mm to 40 mm.

7. A vehicle, comprising:
the vehicle transmission according to claim 1;
an internal combustion engine;
a wheel;

a first power transmission member that connects the internal combustion engine and the vehicle transmission and which transmits drive force from the internal combustion engine to the vehicle transmission; and a second power transmission member that connects the vehicle transmission and the wheel and transmits drive force from the vehicle transmission to the wheel.

\* \* \* \* \*